June 7, 1932. J. F. SCHILLER 1,861,982
APPARATUS FOR AGITATING LIQUIDS
Filed March 5, 1929   4 Sheets-Sheet 1

WITNESSES
Harold F. Wood

INVENTOR.
Joseph F. Schiller
BY
Joshua R. H. Potts
ATTORNEY

June 7, 1932. J. F. SCHILLER 1,861,982
APPARATUS FOR AGITATING LIQUIDS
Filed March 5, 1929 4 Sheets-Sheet 2
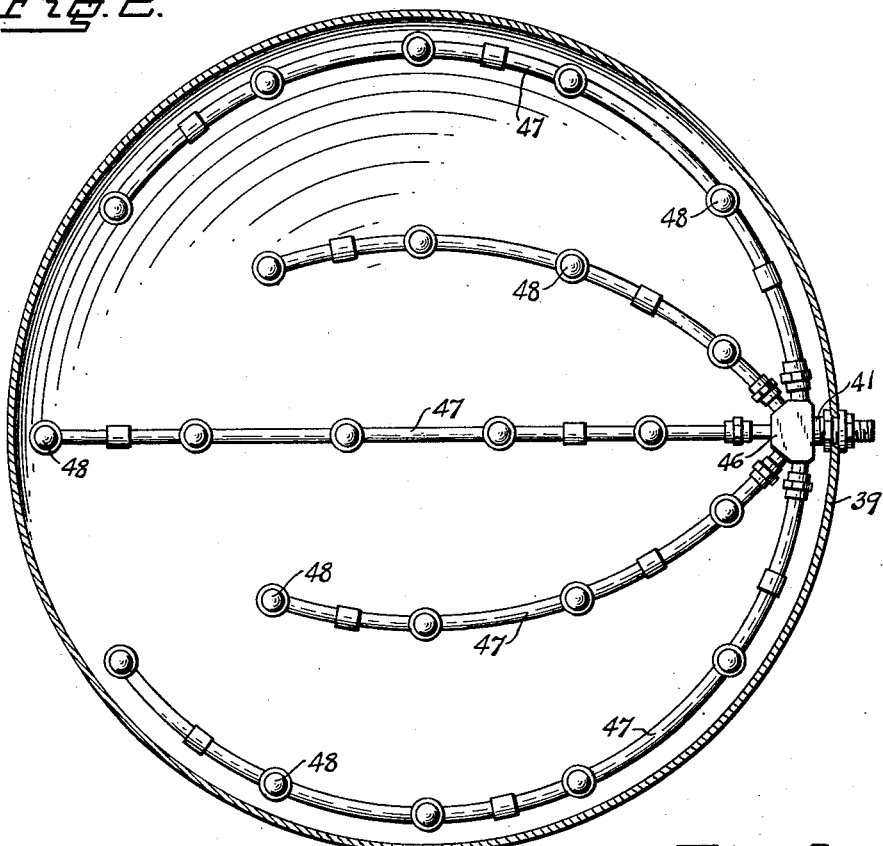
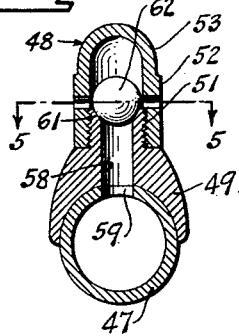
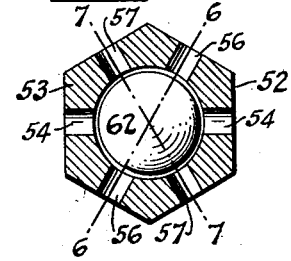
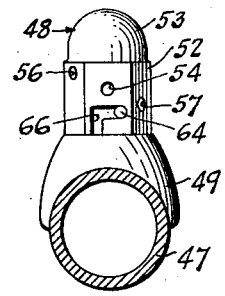
WITNESSES
Harold F. Wood
INVENTOR.
Joseph F. Schiller
BY
ATTORNEY June 7, 1932. J. F. SCHILLER 1,861,982
APPARATUS FOR AGITATING LIQUIDS
Filed March 5, 1929 4 Sheets-Sheet 3
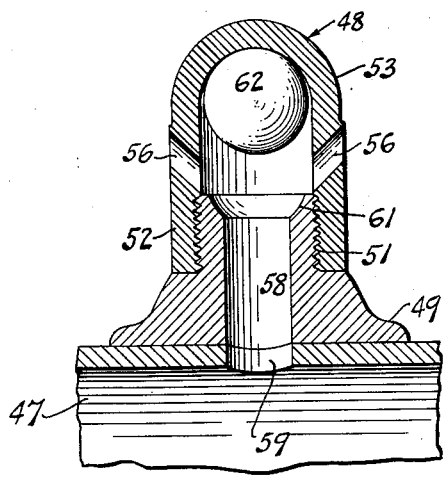
Fig. 6.
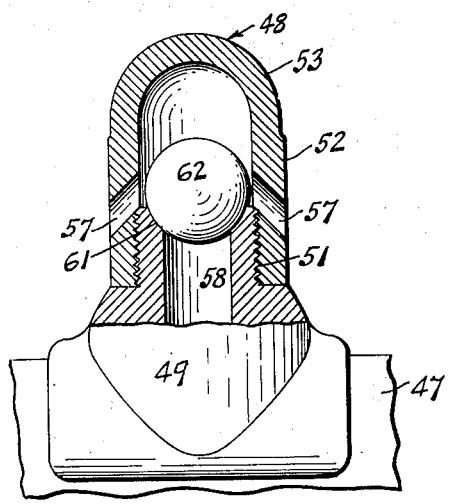
Fig. 7.
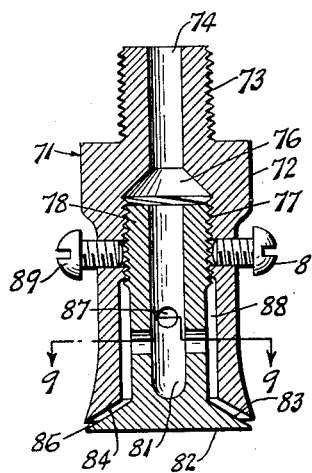
Fig. 8.
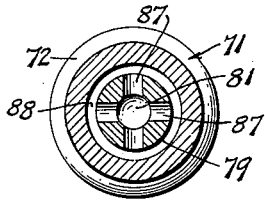
Fig. 9.
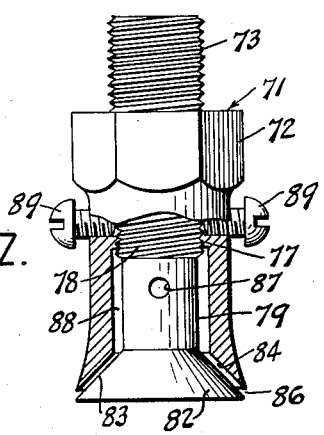
Fig. 10.
Fig. 11.
WITNESSES
Harold F. Wood
INVENTOR.
Joseph F. Schiller
BY
ATTORNEY

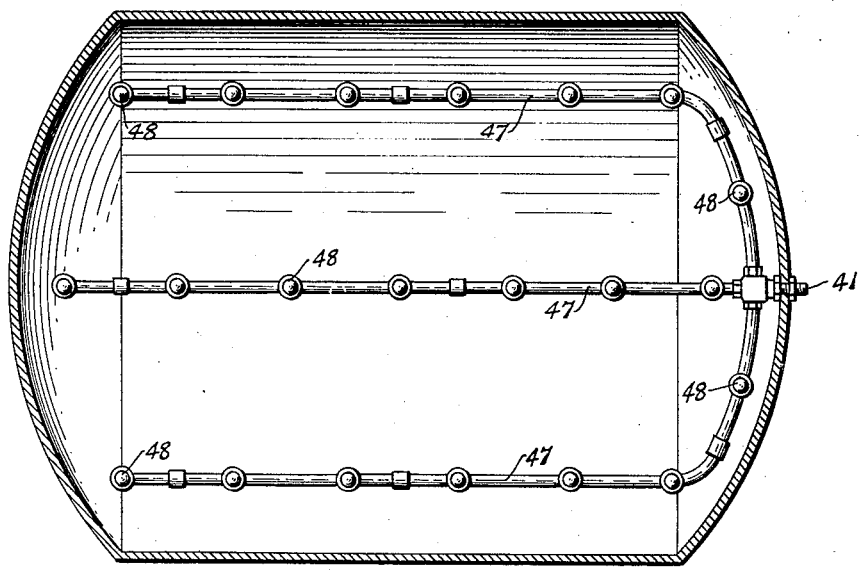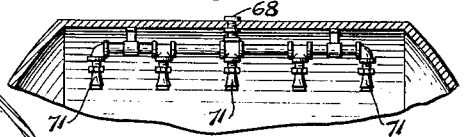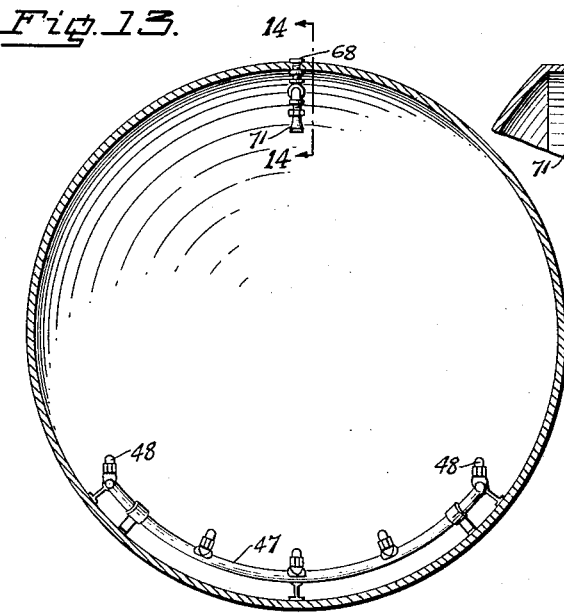

Patented June 7, 1932

1,861,982

UNITED STATES PATENT OFFICE

JOSEPH F. SCHILLER, OF PHILADELPHIA, PENNSYLVANIA

APPARATUS FOR AGITATING LIQUIDS

Application filed March 5, 1929. Serial No. 344,344.

This invention relates to the agitation of liquids such as milk, or other liquids, where it is essential that the same should be kept in a state of constant motion.

In this day of the centralized milk plant for supplying large communities, milk is generally conveyed to the plant by tank trucks or the like, and when received at the plant is usually placed in a large tank or container, prior to its being pasteurized.

The milk in its raw state often contains bad odors, such as rag weed, garlic, and animal odors and these ordors are not eliminated by the pasteurization.

After the milk has been placed in the tanks or containers, where it often remains for a considerable period of time, it is, when convenient, conveyed to the pasteurizer and then passed to storage tanks where it is often retained for a period of twenty-four to forty-eight hours.

In both the receiving tanks and the storage tanks, it is desirable to keep the milk in a state of motion so as to preserve the creaming qualities, i. e., to prevent the cream from gathering on the surface of the body of milk so that the fat globules are collected out of the entire bulk of milk.

It is also necessary to keep the milk at a temperature much lower than that of the surrounding atmosphere and for this purpose the receiving and storage tanks are usually provided with an annular outer casing between which and the inner casing brine is sometimes placed or refrigerating liquid is permitted to expand in order to keep the milk cool.

For the purpose of agitation, the most common form of agitator is the propeller type but this is objectionable in that it beats the milk and, therefore, tends to injure the creaming qualities.

The object of this invention is to provide apparatus for gently agitating the milk to preserve its creaming qualities.

Another object of the invention is to provide mechanism wherein the milk in a container may be gently agitated by means of compressed air.

A further object of the invention is to provide means whereby the compressed air used for agitating the milk will be at such a temperature as to eliminate the necessity for refrigerating means.

Still another object of the invention is to provide means for dispelling the froth or foam which gathers on the surface of the milk, due to the compressed air agitation.

The invention consists, generally stated, in means communicating with a source of sterilized compressed air and extending into a container in which a liquid such as milk is held, and means communicating with said first means for distributing compressed air into the body of the liquid. Further means may be provided for dispelling the froth or foam from the surface of the liquid.

The drawings illustrate an embodiment of the invention and the views therein are as follows:

Figure 2 is an enlarged cross-sectional view of the container showing the arrangement of conduits at or near the bottom of the container, Figure 3 is a vertical sectional view of one of the valves employed in the container shown in Fig. 2.

Figure 4 is a cross-sectional view of one of the branch conduits showing another type of valve associated therewith.

Figure 1:
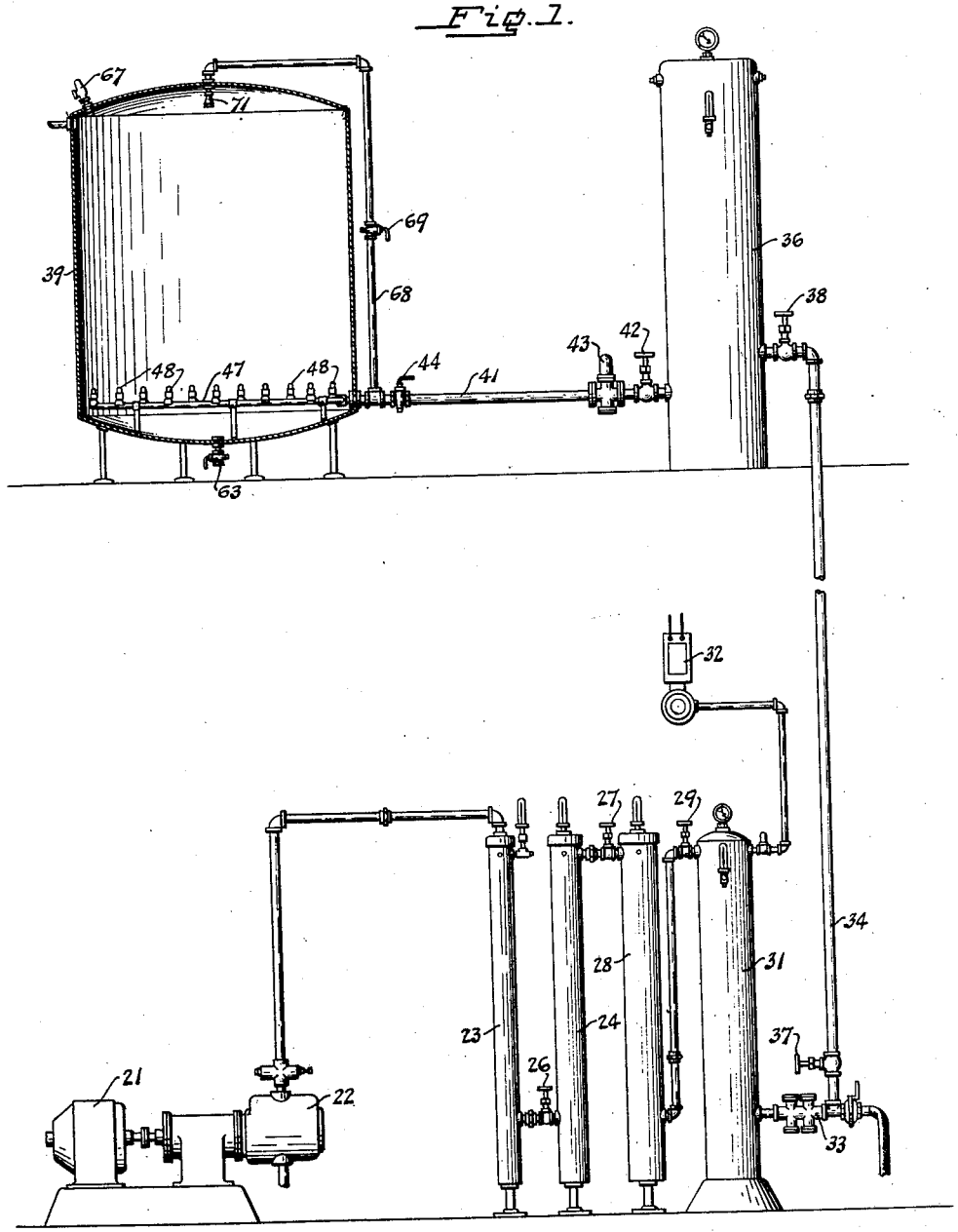
Figure 1 is a general schematic view showing the compressing and sterilizing apparatus associated with the apparatus for agitating the liquid.

Figure 5 is an enlarged cross-sectional view of the valve cap and is taken on the line 5—5 of Figure 3, Figure 6 is an enlarged vertical sectional view of the valve shown in Figure 3, and may be said to be taken at a point represented by the line 6—6 of Figure 5, Figure 7 is a similar view represented by the line 7—7 of Figure 5, Figure 8 is a vertical sectional view of the foam dispelling valve, Figure 9 is a full cross-sectional view and is taken at a point indicated by the line 9—9 of Figure 8, Figure 10 is a side view of the foam dispelling valve with a portion of the outer casing broken away, Figure 11 is a vertical sectional view of a slightly modified valve stem for use with the valve shown in Figures 8 to 10, Figure 12 is a horizontal sectional view of a horizontal type storage tank or container, and shows the arrangement of the branch conduits having the valves thereon for distributing the compressed air to the body of liquid, Figure 13 is a cross-sectional view of the type of container shown in Figure 12, and shows the foam dispelling valves located therein, and Figure 14 is a reduced fragmentary section and is taken at a point indicated by the line 14—14 of Figure 13.

The compressing and sterilizing apparatus shown in Figure 1 is described and claimed in my United States Letters Patent No. 1,706,594, granted March 26, 1929, and my United States Letters Patent No. 1,736,839, granted November 26, 1929.

It will be understood that raw air from the atmosphere could not be used for forcing the milk from the tank trucks into the receiving tanks at the milk plant on account of the bacteria in the air, and while pasteurization reduces the pathogenic germs to a quiescent or non-active condition, the spore bearing germs may not be affected thereby. It is, therefore, necessary when using compressed air for elevating the milk from the tank trucks to the receiving department to use sterilized air and it follows that the air used for agitating the milk in the receiving tanks must likewise be sterilized.

Now since the milk passes from the receiving tanks to the pasteurizer and from thence to the storage tanks, it follows that any air which is used for agitating the milk in the storage tanks must certainly be sterile in order to prevent the inoculation of the milk with the germs from the atmosphere.

Various authorities have stated that if milk were to be raised by means of raw compressed air that the compressed air would impregnate the milk with the pathogenic bacteria therein and that even though pasteurization would sometimes disrupt and would probably always bring the bacteria to a quiescent state, yet the presence of an excessive number or count of bacteria, would act as a toxin and be deleterious to health. However, this only refers to conditions before pasterization and when compressed air is used for agitating the milk in the storage tanks or containers, the same must be sterile, else the milk would be impregnated with living organisms.

Briefly, this apparatus consists of a motor 21 which drives a compressor 22. The compressor exhausts into a tank 23 and from thence to a tank 24 through a valve 26. From the tank 24 the compressed air passes through a valve 27 to a tank 28 and from this latter tank it passes through a valve 29 to the storage tank 31.

The motor 21 is governed by an electric pressure switch 32 which is set to operate the motor so as to keep the pressure in the tank 31 at approximately 2½ atmospheres.

This apparatus is employed in dairies for elevating the milk from the tank trucks in which it is received to an upper floor of the receiving plant. The compressing and sterilizing apparatus may be placed in the basement or any convenient part of the plant and the line 33 leading from the storage tank 31 may be connected by a pipe 34 which leads to a storage tank 36 on one of the upper floors of the plant. The pipe 34 is provided with suitable valves 37 and 38 for controlling the supply of compressed air to the tank 36.

The container 39, shown in Figure 1, is of the vertical type and is shown as illustrative only of the apparatus used for agitating the milk or other liquid.

This container has a conduit 41 entering at a point near the bottom of the same, and this conduit communicates with the storage tank 36. The conduit is provided with a valve 42 for opening and shutting off the supply from the tank 36, and is also provided with a reduction valve 43 and with a cock 44.

It has been previously stated that the pressure of the air in the tank 31 is held at or near 2½ atmospheres by the electric pressure valve 32, but experiments have shown that the amount of pressure required to agitate the milk need not be in excess of 15 pounds per square inch, or approximately 1 atmosphere, and in cases where the compressing and sterilizing apparatus is used both for elevating the milk from the tank trucks and for the purpose of agitating the milk in the containers or tanks, it is necessary to reduce the pressure of the air so as to prevent excessive agitation which might be injurious to the creaming properties of the milk.

Referring now to Figure 2, the conduit 41 has a multiple union 46 at a point where it enters the container 39 and branch pipes or conduits 47 join with this union and are arranged in such a manner that all parts of the milk body may be agitated by the compressed air from the valves 48.

The valve 48 consists of a saddle 49 which is welded or braised onto the branch pipe 47 and has an upper threaded part 51 which engages with the threads on the interior of the hexagonal shank 52 of the valve cap 53. Each face of the hexagonal shank is provided with a port for distributing the compressed air into the body of liquid. These ports are arranged in staggered relation, that is to say, the ports 54 being horizontal, the ports 56 extending upwardly as shown in Figure 6, and the ports 57 extending downwardly, as shown in Figure 7.

These ports thus distribute the compressed air from each of the valves in six different directions.

The saddle 49 is provided with a central duct 58 which communicates with the opening 59 in the branch pipe and terminates at its upper end in a ball valve seat 61 in which the ball 62 rests when the compressed air is cut off by operation of the cock 44.

The top of the threaded part 51 is arranged so that it lies flush with the bottom of the ports 54 and 57 so that when the liquid is drained from the container 39 through the take-off valve 63, all liquid will be drained from the valves and the same will be left perfectly dry, and when the compressed air is shut off the ball 62 will immediately fall into its seat 61 and thus prevent any of the liquid contents of the container from entering the conduit.

Figure 4 shows a form of valve identical with the forms shown in Figures 3, 5, 6 and 7, except that the threads have been omitted from the part 51 and the interior of the cap and the part 51 has been provided with a pin 64 adapted to be engaged by the bayonet slot 66 in the hexagonal shank 52 of the cap.

The container is provided at or near the top of the same with a relief valve 67 for releasing the compressed air from that part of the container above the line of liquid.

Various experiments with the apparatus so far described resulted in a foaming or frothing of the milk to such a degree that the entire upper part of the container above the surface of the milk was entirely filled therewith, which was objectionable in that the creaming qualities of the milk would be injured thereby.

To entirely dispel any froth or foam which might gather on the surface of the milk, a conduit 68 was extended from the conduit 41 and into the center of the upper end of the container 39. This conduit was also provided with a cock 69 for controlling the admission of compressed air to the valve or valves 71 located in the upper part of the tank and communicating with the conduit 68.

The form of valve found to be efficient for dispelling the foam is illustrated in Figures 9 to 11 inclusive, wherein 72 represents the valve casing which is provided with an upper threaded part 73 and with a central duct 74 which communicates with an enlarged or countersunk chamber 76.

Extending down from the countersunk chamber is an internal threaded part 77 adapted to be engaged by the threaded part 78 of the valve stem 79. The valve stem has a duct 81 central of the same and extending to a point short of the bottom of the stem. The bottom of the stem is enlarged, as shown at 82, to provide a tapered face 83 which cooperates with the lower tapered face 84 of the valve casing to provide an annular port 86.

The central duct 81 of the valve stem has ports 87 which discharge into the annular chamber 88 provided between the stem and the valve casing and communicating with the annular port 86. The annular port 86 may be widened or narrowed by screwing the valve stem 79 into or out of the internal threaded part 77, and when the same has been regulated to a nicety, the set screws 89 may be used for fixing the stem at the proper place to provide the required port 86.

In Figure 10 is shown a valve wherein the stem 79 has its tapered face 83 and the casing has its tapered face 84 at different angles from that shown in Figure 9 so as to provide a different spread for the compressed air passing therethrough, while in Figure 11, is shown a valve stem having in addition to the tapered port 86 a lower central port 91 communicating directly with the central duct 81.

The foam dispelling valves 71, probably comprising four in number and each having the annular valve 86 thereof on a different taper, would, in the tank shown in Figure 1, be clustered near the upper central part, while in the horizontal tank or container, as shown in Figures 12 to 14 inclusive, these valves with their different tapers, as found most expedient, would be arranged in the manner shown in Figure 14 so as to properly distribute the compressed air over the surface of the milk or other liquid, to break up any bubbles or foam formation.

The compressed air distributed into the body of the milk will remove therefrom all rag weed, garlic, animal and other odors, and render the milk sweet and pure.

The expansion of the compressed air through the tanks 23, 24, 28 and 31 reduces the temperature far below the temperature of the air when taken into the compressor and the expension of the air through the reduction valve 43 will, consequently, reduce the temperature of the air to a degree lower than the temperature of the air in the supply tank 36, so that the use of refrigerating means will, therefore, be eliminated.

The arrangement of branch conduits in Figures 12 and 13 is illustrative only, as it will be understood that many variations and combinations may be used in containers or tanks of different sizes and contours.

It will, therefore, be understood that the apparatus illustrated herein may be modified and changed in various ways without departing from the invention herein set forth and hereafter claimed.

The invention is hereby claimed as follows:

1. A device for gently agitating liquid in a vessel, comprising an air compressor, means for successively expanding the compressed air to sterilize the same, means for reducing the pressure of the compressed air following its sterilization, and means for distributing the reduced compressed air in the liquid body.

2. A device for gently agitating liquid in a vessel, comprising an air compressor, means for successively expanding the compressed air to sterilize the same, means for reducing the pressure of the compressed air following its sterilization, and a series of valves for distributing the reduced compressed air in the liquid body.

3. A device for gently agitating liquid in a vessel, comprising an air compressor, means for successively expanding the compressed air to sterilize the same, means for reducing the pressure of the compressed air following its sterilization, and a series of valves each provided with ports extending in varied directions for distributing the reduced compressed air in the liquid body.

4. A device for gently agitating liquid in a vessel, comprising an air compressor, means for successively expanding the compressed air to sterilize the same, means for reducing the pressure of the compressed air following its sterilization, means for distributing the reduced compressed air in the liquid body, and means for eliminating the resultant froth from the surface thereof.

5. A device for gently agitating liquid in a vessel, comprising an air compressor, means for successively expanding the compressed air to sterilize the same, means for reducing the pressure of the compressed air following its sterilization, means for distributing the reduced compressed air in the liquid body, and valves for distributing the sterilized compressed air above the body of liquid for dispelling the resultant froth from the surface thereof.

6. An apparatus for agitating liquids in a closed container by means of compressed air, comprising a conduit communicating with a source of compressed air and extending into said container, a series of branch conduits communicating with and leading from said conduit, valves on said branch conduits for distributing compressed air into the body of the liquid, and valves for distributing compressed air for dispelling the resultant froth from the surface of the liquid.

7. A device for gently agitating liquid in a vessel, comprising an air compressor, means for successively expanding the compressed air to sterilize the same, means for reducing the pressure of the compressed air following its sterilization, and a series of valves for distributing the reduced compressed air in the liquid body, said valves being so constructed as to close immediately the compressed air is cut off thereby preventing any liquid from entering the sterile air line.

8. A device for gently agitating liquid in a vessel, comprising an air compressor, means for successively expanding the compressed air to sterilize the same, means for reducing the pressure of the compressed air following its sterilization, and a series of valves each provided with ports extending in varied directions for distributing the reduced compressed air in the liquid body, said valves being so constructed as to close immediately the compressed air is cut off thereby preventing any liquid from entering the sterile air line.

In testimony whereof I have signed my name to this specification.

JOSEPH F. SCHILLER.